United States Patent [19]

Martin

[11] Patent Number: 4,815,892
[45] Date of Patent: Mar. 28, 1989

[54] DRAINAGE MATERIAL AND DRAINAGE CORE FOR A DRAINAGE SYSTEM

[75] Inventor: Keith F. Martin, Blackburn, Great Britain

[73] Assignee: Netlon Limited, Lancashire, Great Britain

[21] Appl. No.: 146,544

[22] Filed: Jan. 21, 1988

[30] Foreign Application Priority Data

Jan. 21, 1987 [GB] United Kingdom ................ 8701259
Mar. 30, 1987 [GB] United Kingdom ................ 8707545
Aug. 19, 1987 [GB] United Kingdom ................ 8719584

[51] Int. Cl.$^4$ ............................................. E02B 11/00
[52] U.S. Cl. ........................................ 405/45; 405/50; 405/128; 405/36
[58] Field of Search ............... 405/19, 36, 43, 45, 405/50, 128, 258; 52/169.5; 428/222, 246, 247, 255, 284

[56] References Cited

U.S. PATENT DOCUMENTS

| | | | |
|---|---|---|---|
| 4,096,701 | 6/1978 | Den Boer | 405/19 |
| 4,572,700 | 2/1986 | Mantarro et al. | 405/45 X |
| 4,574,541 | 3/1986 | Raidt et al. | 52/169.5 |
| 4,639,165 | 1/1986 | Flecknoe-Brown | 405/45 |
| 4,733,989 | 3/1988 | Harriett | 405/43 |
| 4,749,306 | 6/1988 | Demeny | 405/45 |

Primary Examiner—David H. Corbin
Attorney, Agent, or Firm—Holman & Stern

[57] ABSTRACT

A drainage system having an at least 2.5 mm thick biplanar mesh structure drainage core and a filter material against one face and a filter material or impervious member against the other face. The drainage core has generally parallel main strands interconnected by generally parallel subsidiary strands. The main strands are at least twice as tall as the subsidiary strands. The outer faces of the subsidiary strands are coplanar with, and form, one face of the drainage core. The ratio of the free cross-sectional area of each main flow channel to the free cross-sectional area of each subsidiary flow channel, if any, is at least 2.5:1. The drainage core can resist pressures of at least 400 kPa, exhibits a flow fall-off of not more than 20% under an external pressure normal to the faces of 400 kPa.

11 Claims, 9 Drawing Sheets

DRAINAGE MATERIAL AND DRAINAGE CORE FOR A DRAINAGE SYSTEM

BACKGROUND OF THE INVENTION

The present invention relates to a drainage system and more particularly to a drainage material and to a mesh structure drainage core therefor. The drainage core comprises two sets of generally parallel strands in a bi-planar configuration, by which is meant that the median plane of one set is displaced from the median plane of the other set. The drainage material has a pervious or impervious member against one face, and in use in the drainage system will normally have a pervious member against the other face. The pervious member normally comprises filter material in order to keep soil particles etc out of the drain. Such drainage materials and drainage systems are known, and U.S. Pat. No. 3,371,785, U.S. Pat. No. 3,563,038 and U.S. Pat. No. 3,654,765 describe such systems; GB-A-2 002 686 describes a specific drainage material in the form of a bi-planar plastics material mesh core laminated with a non-woven fabric filter material. Such cores are conventionally made by integral extrusion in a plastics material, and integrally-extruded mesh structures are inexpensive and corrosion resistant and are convenient to store, transport and use. The cores are symmetrical about their median plane, i.e. the strand heights are substantially equal.

There are three main types of drainage system in which the drainage materials are used:

(i) As slit drains in soil in each case positioned roughly vertically in the soil. "Vertical drains" lead down to a duct at the bottom for the collection of water and "horizontal drains" are for carrying the water away generally horizontally. Normally, the drainage core will have a pervious member against both faces.

(ii) On the sides and bottoms of waste management pits, for draining water to one or more sumps in the bottom. One such waste management pit has an impervious lining on which is placed the drainage core with a pervious material on top of the mesh structure. However, there can be a lower layer as a safety measure, in which there is a lower, impervious lining with a mesh structure core on top, overlain by the next impervious lining. On the sides, which usually slope, it is most efficient for the water to flow straight down the fall line, but on the bottom multi-directional flow may be required to enable the water to reach the sump(s).

(iii) Against foundations of houses or bridges. In this case, the drainage core can be immediately against the foundation, with a pervious member on the outside, to drain ground water away from the foundations.

The bi-planar mesh structure core provides channels between the strands for the flow of water within the mesh structure, and the outer faces of the strands also provide a support against which the pervious or impervious member rests. Such mesh structure cores are of diamond form, i.e. the sets of strands run each at an angle to the intended flow direction, and the openness of the structure was considered important in enabling the flow to pass from one plane to the other. However bi-planar cores do not have an ideal configuration and have poor crush resistance. Considerable efforts have been made in order to increase the drainage capacity of such cores. This is done by increasing the heights of the strands, and suitably thickening the strands in order to prevent them bending over or collapsing. Although greater flow capacities can be achieved in this way, the flow capacity per unit mass of material used in the mesh structure does not increase very impressively.

THE INVENTION

The present invention provides drainage materials, an integrally-extruded plastics material mesh structure drainage core, and a drainage system.

The main strands are of substantially greater cross-sectional area than the subsidiary strands, and are taller than they are wide or at least of roughly square or circular section. The main strands define the flow channels along the core while the subsidiary strands hold the structure together. If, as is preferred, the subsidiary strands are closer together than the main strands, they give improved support to the pervious or impervious member on that side, but being simple structural filaments holding the main strands together, and being thin, they nearly completely eliminate the secondary flow channels which would normally exist in a conventional bi-planar structure having two sets of equal-sized strands, enhancing the primary flow performance of the structure as a whole. In holding the main strands together, the subsidiary strands keep the main strands the proper distance apart and upright.

The drainage material of the invention gives a remarkable increase in drainage capacity. With the same mass per unit plan area, a drainage core of the invention can provide a drainage flow which is many times that of a conventional bi-planar core. In effect, this has been achieved by the redistribution of the material of which the drainage core is made, making one set of strands thinner and the other thicker.

The invention dramatically reduces turbulence caused by interplanar flow in the prior bi-planar cores; in the prior bi-planar cores, there were two sets of flow channels at an angle to each other and severe turbulence occurred at the mesh openings, where the flows passed across each other. Furthermore, any flow passing from one plane to the other changed flow direction, usually by about 60° to 90°, whilst still flowing in generally the same direction along the core. In the invention, although there may be a small amount of flow in the channels between the subsidiary strands (depending upon the orientation of the mesh structure and the particular application), the main flow is in the channels between the main strands and the water is able to flow uninterrupted from end-to-end of the drainage core (provided the main strands extend in the appropriate direction)—there is little or no interplanar flow.

The ratio of the free cross-sectional area of substantially each main flow channel (area a illustrated in FIG. 18) to the free cross-sectional area of substantially each subsidiary flow channel (area b illustrated in FIG. 18), if any, is at least 2.5:1, and may be at least 3:1 or at least 4:1 or at least 5:1. One preferred value is about 4.3:1 or more than 4.3:1. Up to a certain critical value, the greater the ratio, the greater the flow rate per unit thickness or unit polymer weight. If at one face of the mesh structure, the respective faces of the main and subsidiary strands are coplanar, the main strands will completely block any flow channels between and parallel to the subsidiary strands, and there will be no free cross-section and b=0. The reference to "substantially each" above does not exclude the possibility of there being one or more anomalous flow channels, e.g. due to having two main strands closer together than the average. If necessary, average values can be calculated.

Figure 18:
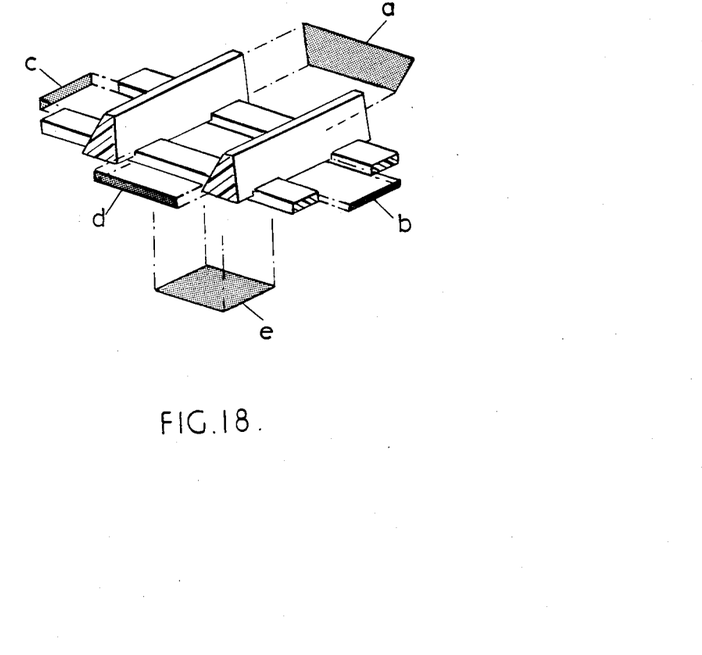
FIG. 18 illustrates various area measurements on a drainage core of the invention.

Referring to FIG. 18, other area ratios can be significant, and the preferred minimum values are:
a:c—2.5:1, more preferably 3:1, or 4:1 or 5:1;
a:d—2:1, more preferably 2.5:1 or 3:1;
e:a—2:1, more preferably 2.5:1.

The invention has other advantages, compared to the conventional bi-planar cores.

The compressive resistance is significantly greater as there is little tendency for one set of strands to be pressed into the other (which occurs in the conventional bi-planar structures). The invention provides a high flow drainage core which can exhibit a flow fall-off of not more than about 20%, or than about 15%, under an external pressure normal to the faces of 400 kPa. Fall-off is as explained in the Table below. The main strands can be tall, greatly increasing the flow channel cross-section, and in order to provide sufficient strength the bases of the main strands (where they are interconnected by the subsidiary strands) can be fairly wide without significantly reducing the flow channel cross-section although interplanar flow is greatly reduced or eliminated. If a pervious member is to be laid against the face of the drainage core defined by the tops of the main strands, and if the pervious member would sag too much, a mesh can be laid immediately on the tops of the main strands in order to give better support to the pervious member.

Nonetheless, on the other side of the drainage core, the subsidiary strands in effect define the face and can be as close together as is necessary in order to provide good support for a pervious material without the pervious material sagging and significantly obstructing the flow channels—the subsidiary strands can have a relatively flat section.

To provide a satisfactory drainage core, the main and subsidiary strands must be sufficiently closely spaced to exercise their proper function. This relates to the overall thickness of the core (whether there is a single layer or interdigitated layers) or of a layer thereof. Preferably the pitch of, or spacing between adjacent sides of, the main strands is not substantially greater than twice or not substantially greater than three or than four times or not substantially greater than ten times the thickness of the respective layer or the overall thickness. Preferably the pitch of the subsidiary strands is not substantially greater than twice the overall thickness or not substantially greater than three or than four times or not substantially greater than six times the thickness of the respective layer or the overall thickness. To achieve such pitching, it is preferred not to substantially orientate the core material—i.e. though draw down or expansion over a mandrel may occur immediately after extrusion but before cooling, it is preferred to avoid any post-cooling stretching.

The minimun ratio of the heights of the main and subsidiary strands is preferably 2, but more preferably 3 or even 3.5 or 4, though a minimum of 2.5 may give adequate benefits and suitable ratios are about 3 or about 4; the height of the main strands may be up to for instance 10 times the height of the subsidiary strands.

The main strands are preferably substantially further apart than the subsidiary strands, both the pitch of the main strands and the spacing between adjacent sides of the main strands being substantially greater than the corresponding parameter of the subsidiary strands; the preferred minimum ratio is about 1.5:1 and the preferred maximum ratio may be about 5:1 or more preferably about 2:1. However, the main strands could be the same distance apart, or closer than, the subsidiary strands.

Depending upon the manufacturing machinery and techniques used, the strands may have heights and widths which vary to a greater or lesser degree along the lengths. Little difficulty is experienced in determining the dimensions of the strands if the strands are of fairly uniform heights or widths, but if the height or width is non-uniform, the effective height or width or area is that half-way between two crossing strands (e.g. measuring the height of the main strand half-way between two subsidiary strands). The measurement can be made using e.g. a Vernier gauge with "chisel edge" blades, or by sectioning and measuring as an enlarged shadowgraph. Nonetheless, the strands are preferably of substantially constant cross-section along their length, having regard to the method of production, in the sense that no variation of cross-section is deliberately introduced.

Preferably, substantially all the main strands are substantially similar or identical to each other. Preferably, substantially all the subsidiary strands are substantially similar or identical to each other.

The drainage core must be sufficiently thick to act as an efficient drainage core. Thus it is desirable that the core or a layer thereof should have an overall (face-to-face) thickness of at least 2, 2.5 or 3 mm, or even of at least 4.5 mm. The core is relatively heavy, and would normally have a weight of at least 300, 400 or 500 gm/m$^2$.

The mesh drainage core can be made of any suitable plastics material, and the plastics material may be foamed. Although the strands may be blown (i.e. contain pores or cells), they are preferably not hollow, and in general it is preferred to have substantially solid strands. The strands should be pressure resistant. Although some squeezing down may occur, no catastrophic collapse must occur at pressures to be expected in use. A practical minimum pressure is 100 kPa, though for deeper applications one can expect ground pressures of 200–1000 kPa or more.

The drainage core is preferably made of plastics material by integral extrusion, and suitable methods are described in GB-A-836 555, GB-A-969 655, GB-A-1 406 641, and GB-A-1 406 642. The invention can give a specific advantage if the mesh structure is integrally extruded using at least one rotating die (as in GB 836 555). When symmetrical bi-planar mesh structures are made with tall strands, careful control is necessary to ensure that the strands stand vertically; as the strands of each set have the same cross-section, the effect of a strand of one set on the strand of the other set can be very pronounced. In the case of the invention, the effect of the subsidiary strands on the main strands is very much less pronounced and the main strands can be much more easily maintained in a vertical position (i.e. the cross-sections of the main strands can be approximately symmetrical about a line normal to the plane of the mesh structure), further increasing compression resistance.

The drainage core can be laminated to the pervious or impervious member(s) in the factory or on site. The layers can be simply laid together or can be bonded; the preferred bonding process is flame bonding, though any suitable heat melting process could be used, or separately applied hot melt or other types of adhesive could be used. Normally, the main strands will extend in the direction in which the drainage water is to be conveyed, though for instance a 45° angle is acceptable. Wide vertical drains can be made by having side-by-side pieces of mesh structure, held together by laminating and bonding to the pervious or impervious member.

Any suitable mesh construction may be used. A useful construction is a square construction or what is termed a trellis construction herein (where the subsidiary strands are at an angle less than 90° C., say 45° or 60°, to the main strands). Diamond constructions may be used; it is preferable when using diamond constructions to have the main strands inclined in one direction to the machine direction and the subsidiary strands inclined in the opposite direction to the machine direction—preferably, the angles of inclination are equal and opposite, say 45°.

Plastics material membranes for use as the impervious member are well known. THe pervious member can be a filter fabric laid direct on the drainage core, or supported against a fine mesh structure on the drainage core. The filter fabric can be any suitable fabric which gives the necessary filtration effect, including needled non-woven fabrics, chemically or thermally bonded non-woven fabrics, woven or knitted fabrics, and woven fabrics with a flexurally stiff weft element to give better support when laid across the tops of the main strands.

Advantages of the invention can also be obtained from a two-layer drainage core. The layers can be of any suitable type, and need not be the same. One or both layers can be in accordance with the present invention, or one layer can more generally have two sets of strands at an angle to each other, normally with the median planes of the sets spaced apart, and the strands of one set being a substantially greater distance apart and/or substantially taller than the strands of the other set. The impervious layer will normally be a plastics material membrane or film, e.g. a polyethylene film of thickness 0.3 mm. The impervious layer can be merely placed in position, or can be bonded to one or both of the other layers.

In one arrangement, main strands of each layer engage a substantially impervious layer placed between the two layers, and the main strands of one layer are at an angle to the main strands of the other layer so that they cross and support one layer securely against the other. More specifically, it is preferred that the or each face which is against the impervious dividing layer is that remote from the subsidiary strands.

In another arrangement, the two layers of the mesh structure are placed with the subsidiary strand faces (the faces with which the outer faces of the subsidiary strands are generally coplanar) against each other. The respective subsidiary strands of the two layers preferably extend at a substantial angle to each other, to provide good support of one layer against the other without interdigitation; this is particularly so if the main strands are spaced from the engaging faces. However, the main strands are preferably all substantially parallel, i.e. extending in the drainage direction. The arrangement is preferably achieved using what is termed a trellis construction.

THE DRAWINGS

The invention will be further described, by way of example, with reference to the accompanying drawings, in which.

PREFERRED EMBODIMENTS

FIGS. 1 to 4

Figure 1:
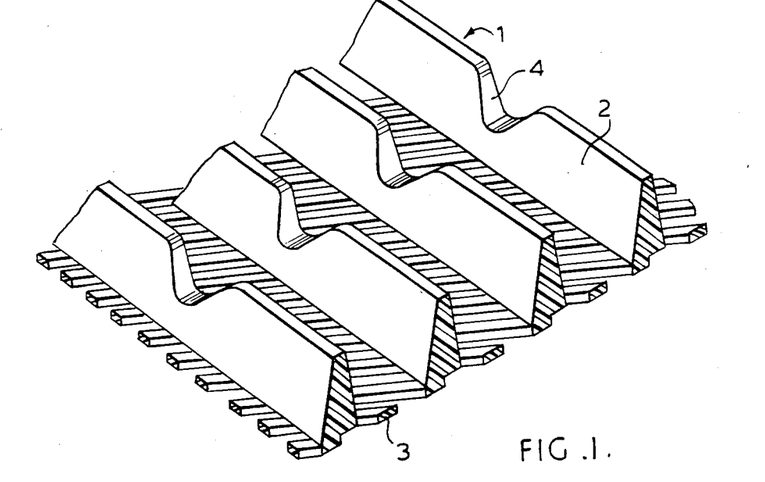
FIG. 1 is an isometric view of a first drainage core of the invention.

FIG. 1 shows the first core, of trellis construction, formed by integral extrusion in a plastics material. The mesh structure 1 has parallel main strands 2 interconnected by parallel subsidiary strands 3. The main strands 2 are substantially taller than the subsidiary strands 3.

The main strands 2 have generally flat tops and bases, with the bases wider than the tops, and are of generally truncated triangular shape, being approximately symmetrical about a line normal to the faces of the mesh structure. The subsidiary strands 3 are shown as being of generally flat shape, being generally rectangular in cross-section with the long sides of the rectangles parallel to the plane of the mesh structure; however, instead of having flat subsidiary strands 3, closer subsidiary strands 3 could be used, of say square cross-section, or even taller than their width. The bases of the main strands 2 are spaced from the bottom of the mesh structure 1, leaving small openings within the core between the subsidiary strands 3.

The mesh structure 1 is made using a standard trellis construction technique in accordance with GB-A-836 555, with a static die and a rotating die. In a construction used for vertical drains (FIG. 2), the static die extrudes the main strands 2, whereas in a construction used for horizontal drains (FIG. 3), the static die extrudes the subsidiary strands 3. Diamond constructions (FIG. 4) can be used e.g. for waste management pits.

FIG. 1 also indicates that depressions or grooves 4 can be formed across the main strands 2. The depressions 4 are spaced out along the main strands 2 and are formed by pressure after extrusion and cooling. The grooving is not essential, but makes it easier to roll up the mesh structure 1 if the main strands 2 extend in the machine direction. For instance, the main strands 2 in a 12 mm thick mesh structure may have a height of 10 mm, and can be formed with for example 5 mm deep grooves 4. The grooves 4 can be for instance 15 to 50 mm apart, depending on the height of the main strands 2. The cooled mesh structure 1 can be passed through a pair of rolls; one of the rolls has spaced bars which form the grooves. The grooving does not have any marked effect on the strength of the main strands 2.

EXAMPLE

Figure 2:
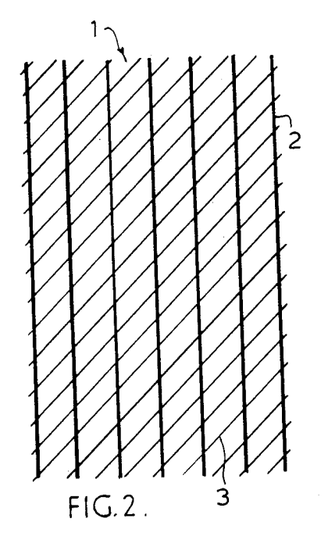
FIG. 2 is a schematic illustration of a vertical drain in accordance with the invention.
Figure 3:
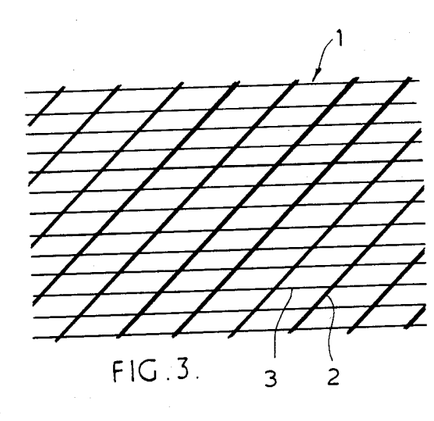
FIG. 3 is a schematic illustration of a horizontal drain in accordance with the invention.
Figure 4:
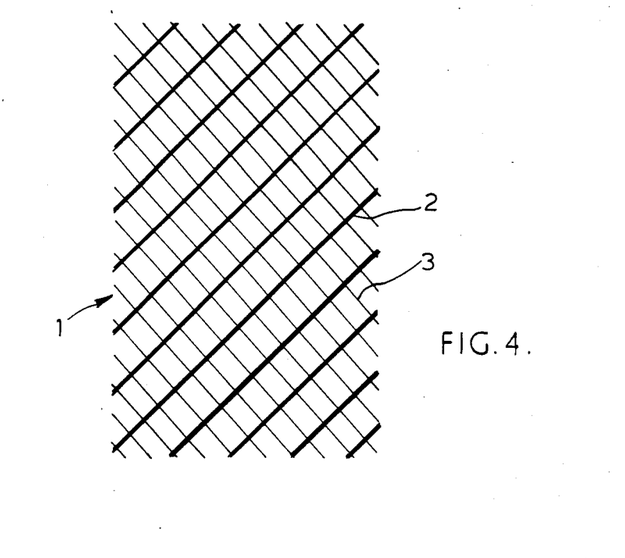
FIG. 4 is a schematic illustration of a second drainage core in accordance with the invention.

An example of the drainage core of FIGS. 1 and 2 is as follows:

The mesh structure was integrally extruded in unblown black high density polyethylene. The dimensions were as follows:
  pitch of main strands 2:—11 mm
  height of main strands 2:—4.25 mm
  width of bases of main strands 2:—3 mm (minimum)
  width of tops of main strands 2:—1 mm (minimum)
  distance apart of main strands 2:—8 mm (maximum)
  pitch of subsidiary strands 3:—5.5 mm
  height of subsidiary strands 3:—1.1 mm
  width of subsidiary strands 3:—1.5 mm (minimum)
  distance apart of subsidiary strands 3:—4 mm (maximum)
  overall thickness of mesh structure:—5.65 mm
  weight per unit area:—1300 gm/m$^2$.
  height ratio main:subsidiary strands:—3.9
  a:b:—4.3:1
  a:c:—3.3:1
  a:d:—2.3:1
  e:a:—1.6:1
  average fall-off (see Table below):—8.4%

The overall thickness was slightly greater than the sums of the strand thicknesses due to flooding when the dies were in register.

As one example of a drainage material, the core formed as above had black polyethylene film of thickness 0.3 mm flame bonded to one face and a proprietary non-woven pervious material formed of polypropylene fibres and roughly 0.75 mm thick flame bonded to the other face.

Figure 5:
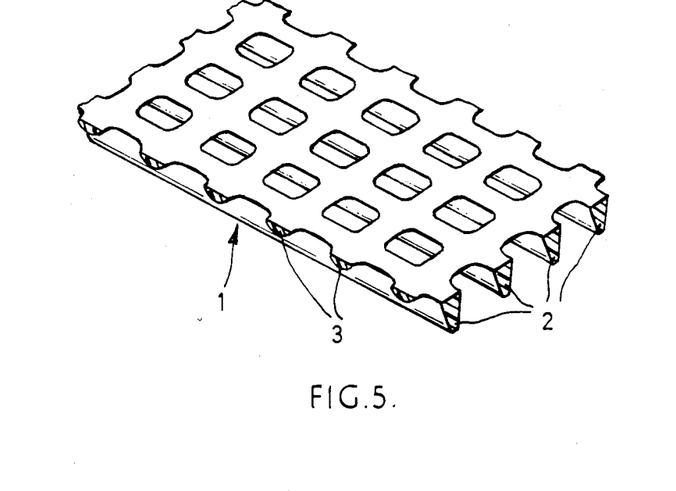
FIG. 5 is an isometric view of a third drainage core of the invention.
Figure 6:
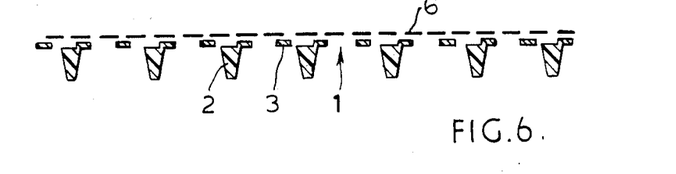
FIGS. 6 to 12 are schematic cross-sections through various drainage materials of the invention.
Figure 7:
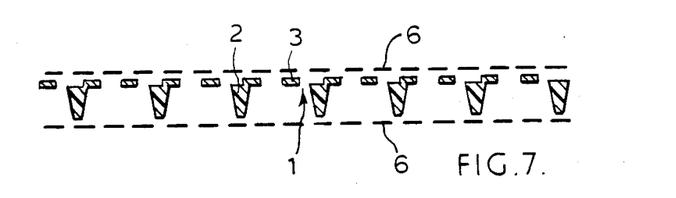
Figure 8:
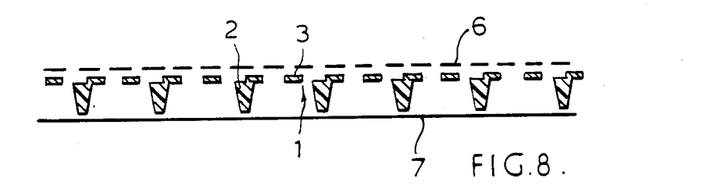
Figure 9:
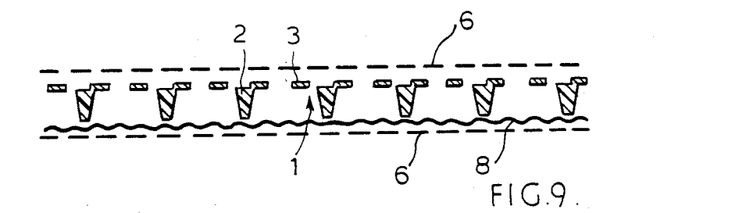

FIG. 5

FIG. 5 shows the third drainage core. For convenience, the same references are used as in FIGS. 1 to 4, and in general terms the main strands 2 and subsidiary strands 3 are similar. However, the main strands 2 are closer together than the subsidiary strands 3 (but this is not necessarily so). The mesh structure is made as described in GB-A-969 655; the subsidiary strands 3 have an aerofoil-like cross-section, which is caused by the opening and closing motion of the die of GB-A-969 655. Furthermore, the top face (as seen) of the mesh structure 1 is defined both by the faces of the main strands 2 and by the faces of the subsidiary strands 3, which are substantially coplanar. This is done by extruding over a mandrel which causes the subsidiary strands 3 to move up into the bases of the main strands 2. In this way, each mesh opening has the whole of its periphery in the plane of the top face, which can provide good support for a filter material or impervious membrane laid against the flat face of the core and prevent the filter material membrane being pressed too far into the core. This core has excellent compression resistance.

Various Configurations (FIGS. 6–11)

Most of these configurations need not be described in detail. 1 is a mesh structure or core in accordance with the invention, 6 is a pervious fabric, 7 is an impervious film, and 8 is a close-pitch plastics material net.

Figure 10:
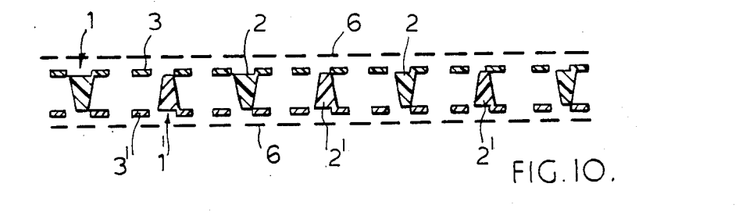
Figure 11:
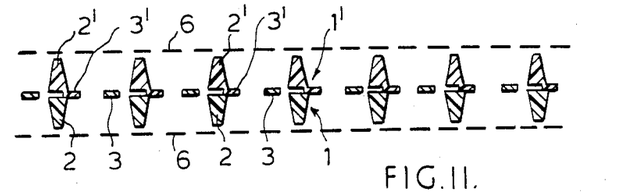
Figure 12:
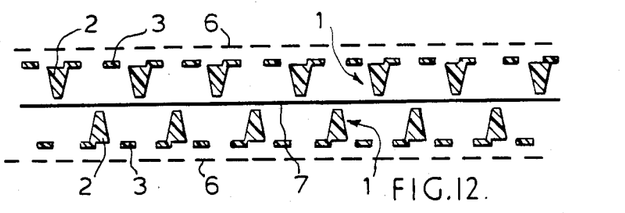

However, FIG. 10 illustrates a special configuration in which two mesh structures 1,1' of the invention are placed together with the main strands 2 of one main structure 1 parallel to and between the main strands 2' of the other mesh structure 1' so that the subsidiary strands 3,3' are on the opposite faces of the combination so formed. FIG. 11 illustrates the reverse configuration with the subsidiary strands on the inside.

Figure 13:
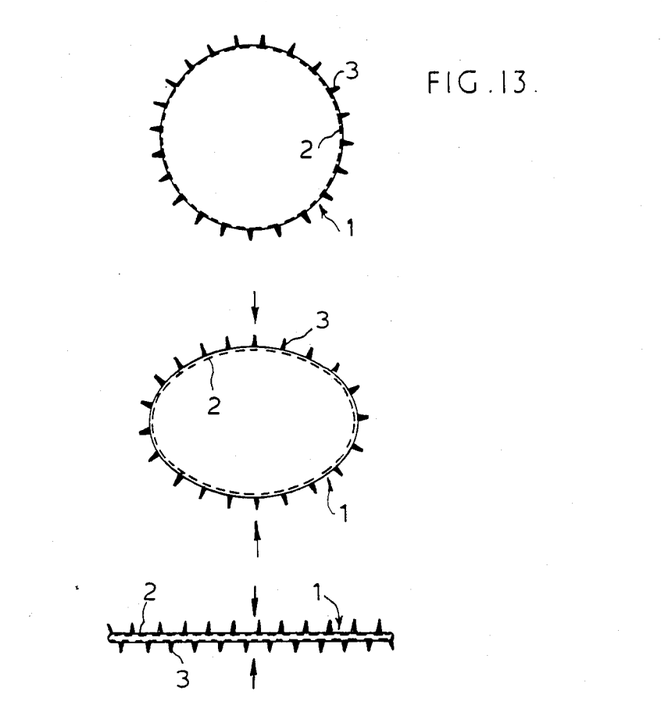
FIG. 13 shows three schematic cross-sections, showing the formation of another drainage material of the invention.
Figure 14:
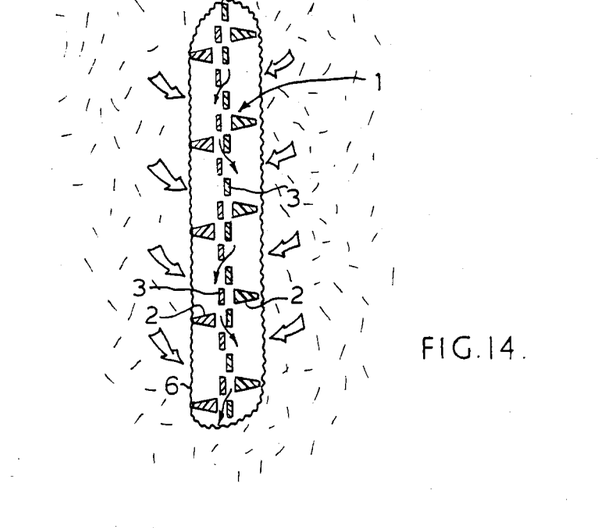
FIG. 14 shows the use of the drainage material of FIG. 13 as a slit drain.
Figure 15:
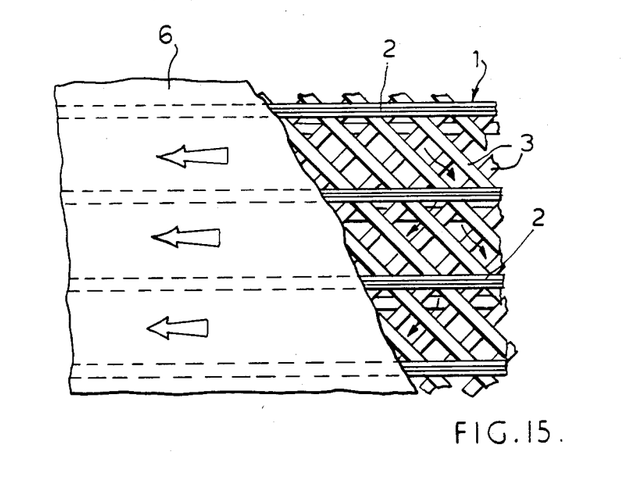
FIG. 15 is a side view of the slit drain of FIG. 14.

FIGS. 13–15

The mesh structure 1 of FIG. 13 is extruded in tubular form as a trellis construction, with the main strands 2 in the machine direction, i.e. longitudinally of the tube, and the subsidiary strands 3 extending helically on the inside of the tube. The tube is laid flat to provide a two-layer drainage core.

FIGS. 14 and 15 show such a two-layer drainage core, installed in a drainage system. The porous material 6 is a geotextile, wrapped around the strip-like core. The geotextile may for instance be a woven fabric or a spun-bonded fabric. The geotextile can be bonded to the core or just wrapped. In detail, each mesh structure layer can be as in FIGS. 1, 2, 3 or 4.

The two-layer core can be used for curb side drainage. Strips are made of suitable width (for instance 300, 600 or 900 mm) with the main strands running longitudinally and a pervious material on each outer face. The strip is placed in a vertical slit (a narrow slit trench) in soil by the side of and parallel to a road or runway with the main strands 2 running in the direction of the road or runway and nearly horizontal though with a slight fall. Water permeates from the soil into the drainage core over the whole surface area and then drains substantially horizontally along the channels formed by the main strands 2, this being the primary flow direction (large arrows in FIG. 15); some water may be able to flow downwards between the subsidiary strands 3 (small arrows in FIG. 15), depending on the precise configuration of the mesh structure. Ultimately, the water would exit into a collection pit or main sewer.

Figure 16:
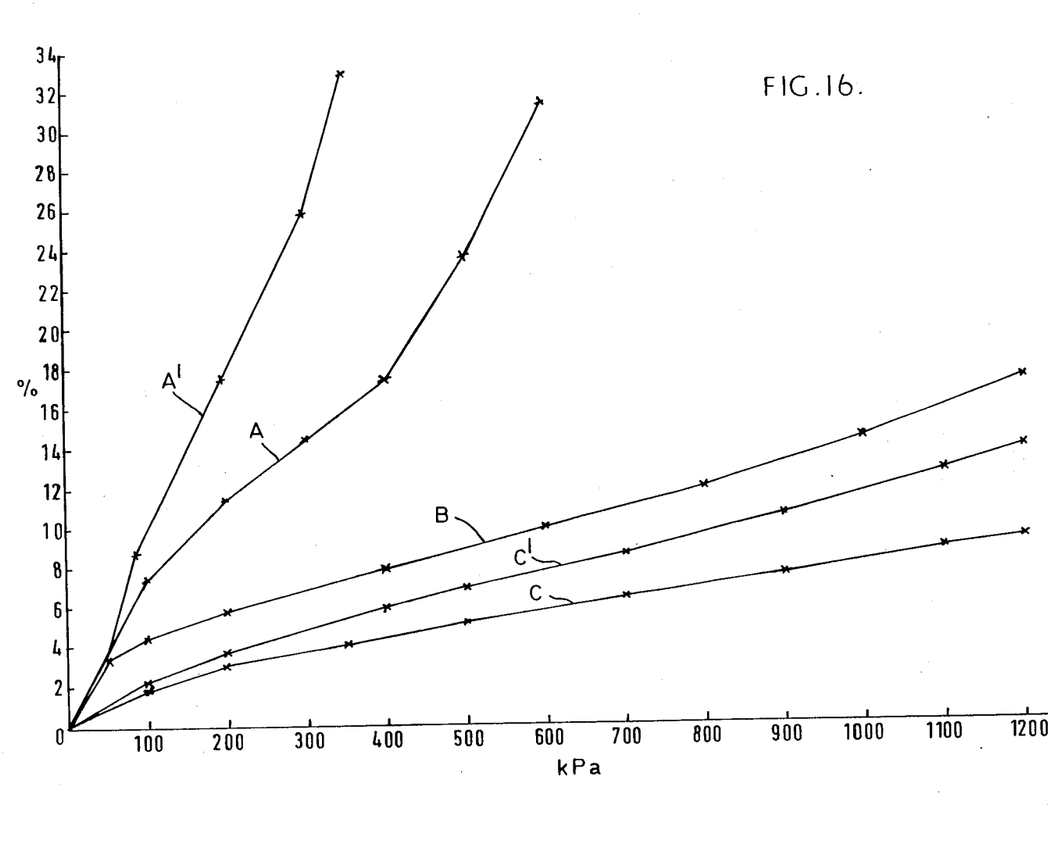
FIG. 16 is a graph showing the compressive resistance of various drainage cores, specifically of compressive strain (%) against load (kPa), i.e. load normal to the plane of the core.
Figure 17:
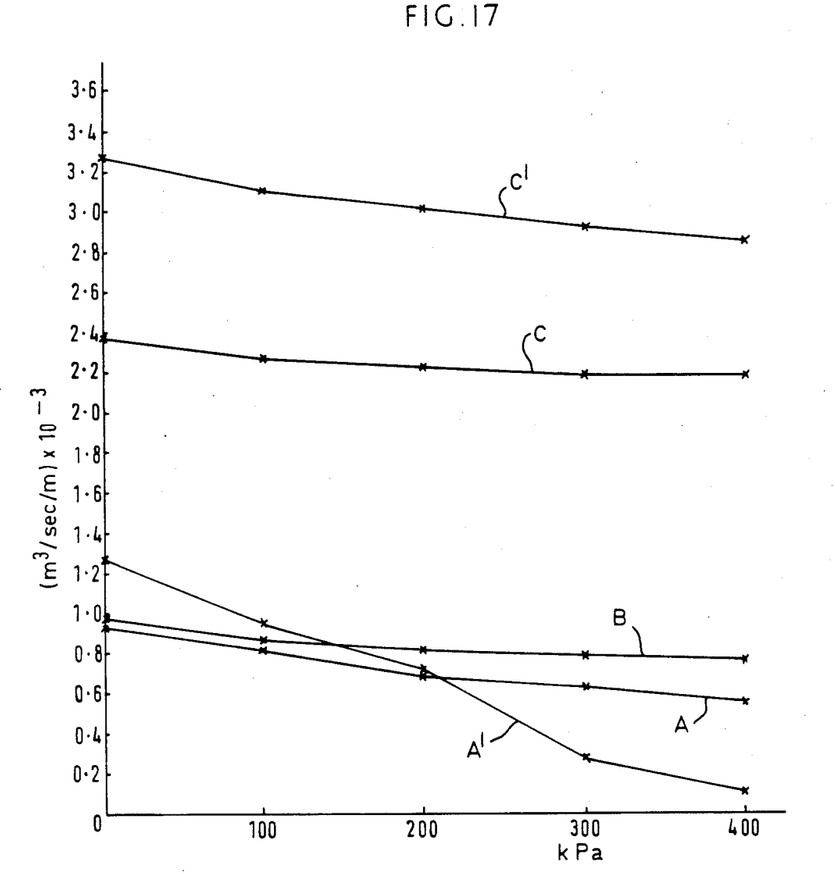
FIG. 17 is a graph showing the flow performance of various drainage cores per Kg of resin, specifically of flow rate in (cubic metres volume/seconds/metre width) x $10^{-3}$ against stress normal to the plane of the drainage material, in kPa.

Graphs (FIGS. 16 and 17)

The graphs show the performance for the following:
A—traditional bi-planar diamond mesh structure core integrally extruded in unblown low density polyethylene by the method of GB-A-836 555. The sets of strands run in opposite 45° directions to the flow direction.
B—tri-planar three-strand core integrally extruded in unblown high density polyethylene by the method of GB 1 290 437. The centre set of strands runs in the flow direction and the other two sets of strands run in opposite 45° directions to the flow direction. The strands of all three sets have substantially the same height.
$C_1$—the mesh structure core of the Example above.
A' was made from the same dies as A, and C' was made from the same dies as $C_1$. A' and C' were as A and $C_1$ except that the resin was blown, having a density of about 65% of the unblown resin—in both cases the weights were reduced and the thicknesses were increased. In A, A' and B both or all sets of strands were at a pitch of 11 mm.

The graph of FIG. 16 is not discussed in detail, but the performance reflects that in the graph of FIG. 17.

The graph of FIG. 17 shows that varying the pressure on the surface of the core compresses the structure and restricts the flow as the pressure increases. The mesh structure core, without any material on its faces, was placed between an imperforate base plate and an imperforate pressure plate with the sides of the core blocked off. Water was passed along the length of the core at a pressure gradient of 1.0.

Structures A and A' are inefficient mainly due to high turbulence caused by interplanar flow. The symmetrical bi-planar structure has a poor performance in the compression test (FIG. 16) which also reduces the flow channel cross-section.

Structure B has only a slightly improved performance in the test of FIG. 17, though its compressive resistance (FIG. 16) is a great improvement. There is marked increase in turbulence due to the introduction of a third layer of strands of a substantial thickness.

It can be seen that the mesh structures of the invention, structures $C_1$ and C', have an unexpectedly high flow performance which is retained over a wide range of pressures. This makes the mesh structure particularly suitable for deep drain applications and in particular waste management drains where the pressures on the faces can be very high, of the order of 300 to 400 kPa.

TABLE

The Table below presents the results in the graph of FIG. 17 at a normal stress of 400 kPa, and also indicates the percent flow fall-off from 0 to 400 kPa (i.e. the average slope of the flow rate curves). The structures are as above. Structure $C_2$ was made from the same dies as $C_1$ and had the same weight per unit area, but was slightly different.

| Core (Mesh Structure) | Weight gm/m² plan | Thickness mm | Normal Stress kPa | Flow Rate (m³/sec/m width) × 10⁻³ | Flow Rate/mm thickness (m³/sec/m width/mm thickness) × 10⁻³ | Flow Rate/kg of polymer (m³/sec/m width/kg) × 10⁻³ | Fall Off % | a:b ratio |
| --- | --- | --- | --- | --- | --- | --- | --- | --- |
| A | 700 | 4.5 | 400 | 0.35 | 0.07 | 0.55 | 41 | 1:1 |
| A' | 663 | 5.5 | 400 | 0.08 | 0.0145 | 0.12 | 90 | 1:1 |
| B | 2080 | 7.5 | 400 | 2.0 | 0.27 | 0.96 | 21 | — |
| $C_1$ | 1300 | 5.4 | 400 | 2.84 | 0.526 | 2.18 | 8.4 | 4.3:1 |
| $C_2$ | 1300 | 5.4 | 400 | 3.03 | 0.56 | 2.33 | 6.8 | 5.2:1 |
| C' | 1180 | 6.3 | 400 | 3.37 | 0.53 | 2.85 | 12 | 4.8:1 |

Figure 19:
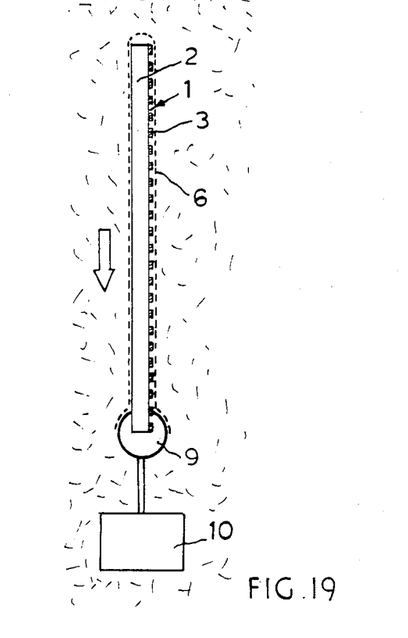
FIGS. 19 to 21 are schematic vertical sections through three drainage systems of the invention.
Figure 20:
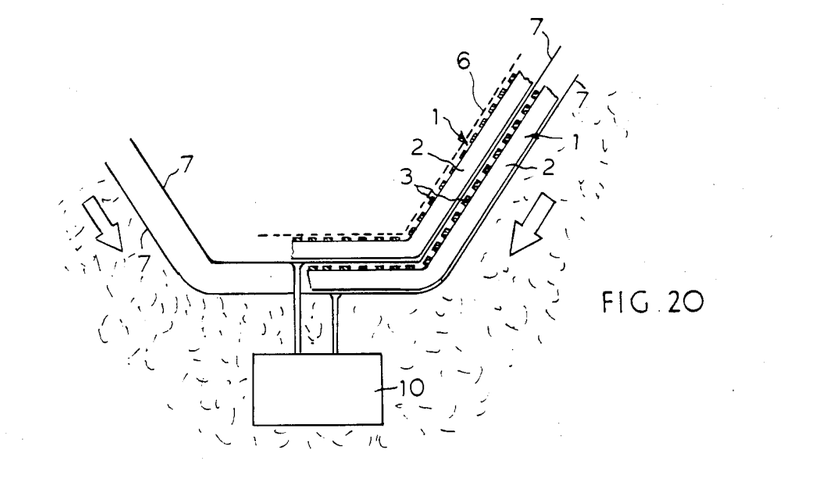
Figure 21:
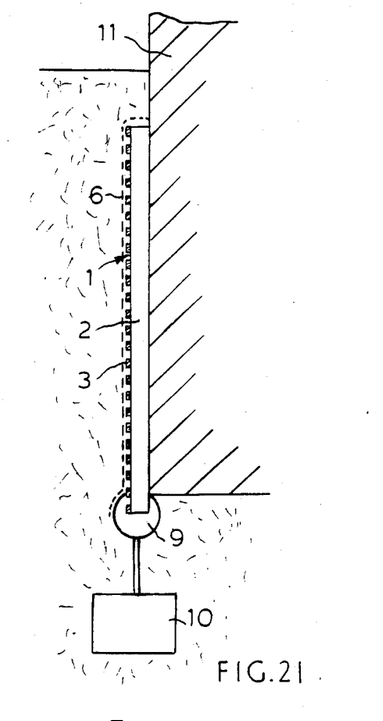

FIGS. 19–21

These Figures illustrate the three main types of drainage system, as at (i) to (iii) in the introduction. A variant of type (i) is shown in FIG. 14. The references are as used above. The drainage core or mesh structure 1 drains vertically into a horizontal duct 9 in FIGS. 19 and 20, and in each case the water is discharged to a collection pit or sump or a main sewer 10. FIG. 21 shows the mesh structure 1 up against the impervious foundation 11 of a building.

The present invention has been described above purely by way of example, and modifications can be made within the spirit of the invention.

I claim:

1. A drainage system comprising:

a mesh structure defining a first face and a second face, having an overall, face-to-face thickness of at least 2.5 mm, and being capable of resisting a pressure over its faces of at least 100 kPa without catastrophic collapse, the mesh structure comprising generally parallel main strands interconnected by generally parallel subsidiary strands, the outer faces of the subsidiary strands being generally coplanar with one of said faces of the mesh structure and the main strands being spaced from said one face, thereby defining main flow channels between and parallel to the main strands and subsidiary flow channels between and parallel to the subsidiary strands, the ratio of the free cross-sectional area of substantially each main flow channel to the free cross-sectional area of substantially each subsidiary flow channel being at least 2.5:1, the main strands being at least twice as tall as the subsidiary strands;

a pervious member against the first face of the mesh structure; and a pervious or impervious member against the second face of the mesh structure.

2. A drainage system comprising:

a mesh structure defining a first face and a second face, having an overall, face-to-face thickness of at least 2.5 mm, and being capable of resisting a pressure over its faces of at least 100 kPa without catastrophic collapse, the mesh structure comprising generally parallel main strands interconnected by generally parallel subsidiary strands, one face of the main strands and the outer face of the subsidiary strands being generally coplanar with one face of the mesh structure, thereby defining flow channels between and parallel to the main strands, the main strands being at least twice as tall as the subsidiary strands;

a pervious member against the first face of the mesh structure; and a pervious or impervious member against the second face of the mesh structure.

3. The drainage system of claim 1, wherein the main strands are generally triangular or truncated triangular in cross-section.

4. The drainage system of claim 1, wherein the widths of the subsidiary strands are greater than the heights.

5. The drainage system of claim 1, wherein depressions have been formed by pressure across the main strands, the depressions being spaced out along the lengths of the main strands.

6. The drainage system of claim 1, wherein the mesh structure has been integrally extruded without substantial stretching after cooling.

7. The drainage system of claim 1, and comprising two layers, one layer being said mesh structure and the second layer being formed of a mesh structure comprising main strands and subsidiary strands, the main strands of each layer facing each other and being at an angle to each other so that the main strands cross and support one layer securely against the other, and an impervious layer between the two layers of mesh structure.

8. The drainage system of claim 1, and comprising two layers, one layer being said mesh structure and the second layer being formed of a mesh structure comprising main strands and subsidiary strands, the subsidiary strands of each layer being on the inside.

9. The drainage system of claim 8, which has been formed by integral extrusion of a tube followed by flattening the tube.

10. An integrally-extruded, plastics material mesh structure drainage core for forming a drainage system, the core having an overall, face-to-face thickness of at least 2.5 mm and being capable of resisting a pressure over its face of at least 100 kPa without catastrophic collapse, the core comprising two layers of mesh structure in the form of a single flattened tube, the mesh structure comprising generally parallel main strands extending generally longitudinally of the tube, interconnected by generally parallel subsidiary strands extending generally helically of the tube, the inner faces of the subsidiary strands being generally coplanar with the inner face of the mesh structure, and the subsidiary strands of one said layer thereby crossing the subsidiary strands of the other said layer to support one layer against the other, the mesh structure thereby defining main flow channels between and parallel to the main strands and optionally subsidiary flow channels between and parallel to the subsidiary strands, the ratio of the free cross-sectional area of substantially each main flow channel to the free cross-sectional area of substantially each subsidiary flow channel, if any, being at least 2.5:1, the main strands being at least twice as tall as the subsidiary strands.

11. An integrally-extruded, plastics material mesh structure drainage core for forming a drainage system, the core having an overall, face-to-face thickness of at least 4.5 mm, the mesh structure comprising generally parallel main strands having a height of at least 4 mm and of truncated triangular cross-section, interconnected by generally parallel subsidiary strands whose width is greater than their height, the outer faces of the subsidiary strands being generally coplanar with one face of the mesh structure, thereby defining main flow channels between and parallel to the main strands and optionally subsidiary flow channels between and parallel to the subsidiary strands, the ratio of the free cross-sectional area of substantially each main flow channel to the free cross-sectional area of substantially each subsidiary flow channel, if any, being at least 2.5:1, the main strands being at least 3.5 times as tall as the subsidiary strands, the pitch of the main strands being at least 1.5 times the pitch of the subsidiary strands, and the core exhibiting a flow fall-off of not more than about 20% under an external pressure normal to the face of 400 kPa.

* * * * *

REEXAMINATION CERTIFICATE (3097th)

United States Patent [19]

Martin

[11] B1 4,815,892
[45] Certificate Issued Jan. 7, 1997

[54] DRAINAGE MATERIAL AND DRAINAGE CORE FOR A DRAINAGE SYSTEM

[75] Inventor: Keith F. Martin, Blackburn, Great Britain

[73] Assignee: Netlon Limited, Lancashire, Great Britain

Reexamination Request:
No. 90/004,011, Nov. 13, 1995

Reexamination Certificate for:
Patent No.: 4,815,892
Issued: Mar. 28, 1989
Appl. No.: 146,544
Filed: Jan. 21, 1988

[51] Int. Cl.[6] ................................................. E02B 11/00
[52] U.S. Cl. ........................... 405/45; 405/50; 405/36; 405/128

[56] References Cited

U.S. PATENT DOCUMENTS

| | | |
|---|---|---|
| 2,919,467 | 1/1960 | Mercer . |
| 3,227,184 | 1/1966 | Anderson et al. . |
| 3,252,181 | 5/1966 | Hureau . |
| 3,371,785 | 3/1968 | Hanami . |
| 3,563,038 | 2/1971 | Healy . |
| 3,654,765 | 4/1972 | Healy . |
| 3,795,180 | 3/1974 | Larsen . |
| 3,906,073 | 9/1975 | Kim et al. . |
| 3,922,329 | 11/1975 | Kim et al. . |
| 4,135,021 | 1/1979 | Patchell et al. . |

FOREIGN PATENT DOCUMENTS

| | | |
|---|---|---|
| 0075993 | 4/1983 | European Pat. Off. . |
| 0099210 | 1/1984 | European Pat. Off. . |
| 0999222 | 1/1984 | European Pat. Off. . |
| 1600202 | 8/1970 | France . |
| 2521374 | 12/1976 | Germany . |
| 836555 | 6/1960 | United Kingdom . |
| 969655 | 9/1964 | United Kingdom . |
| 1049200 | 11/1966 | United Kingdom . |
| 1210354 | 10/1970 | United Kingdom . |
| 1250753 | 10/1971 | United Kingdom . |
| 1288256 | 9/1972 | United Kingdom . |
| 1324661 | 7/1973 | United Kingdom . |
| 1352747 | 5/1974 | United Kingdom . |
| 1406641 | 9/1975 | United Kingdom . |
| 1406642 | 9/1975 | United Kingdom . |
| .1417112 | 12/1975 | United Kingdom . |
| 2002686 | 2/1979 | United Kingdom . |
| 2126944 | 4/1984 | United Kingdom . |
| 83/02790 | 8/1983 | WIPO . |

OTHER PUBLICATIONS

Conwed Pipe Wrapping Mesh.
Brochure entitle "Tensar Environmental System".
Rolled–up Lay–flat Netting Tube.
Brochure entitled "Tensar drainage nets increase your capacity".
Brochure entitled "'Tensar' geogrids in civil engineering".

*Primary Examiner*—Dennis L. Taylor

[57] ABSTRACT

A drainage system having an at least 2.5 mm thick biplanar mesh structure drainage core and a filter material against one face and a filter material or impervious member against the other face. The drainage core has generally parallel main strands interconnected by generally parallel subsidiary strands. The main strands are at least twice as tall as the subsidiary strands. The outer faces of the subsidiary strands are coplanar with, and form, one face of the drainage core. The ratio of the free cross-sectional area of each main flow channel to the free cross-sectional area of each subsidiary flow channel, if any, is at least 2.5:1. The drainage core can resist pressures of at least 400 kPa, exhibits a flow fall-off of not more than 20% under an external pressure normal to the faces of 400 kPa.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 10 and 11 are determined to be patentable as amended.

Claims 3–9, dependent on an amended claim, are determined to be patentable.

New claims 12 and 13 are added and determined to be patentable.

1. A drainage system comprising:
a mesh structure defining a first face and a second face, having an overall, face-to-face thickness of at least 2.5 mm, and being capable of resisting a pressure over its faces of at least 100 kPa without catastrophic collapse, the mesh structure comprising generally parallel main strands interconnected by generally parallel subsidiary strands, the outer faces of the subsidiary strands being generally coplanar with one of said faces of the mesh structure and the main strands being spaced from said one face, thereby defining main flow channels between and parallel to the main strands and subsidiary flow channels between and parallel to the subsidiary strands, the ratio of [the] *a* free cross-sectional area of substantially each main flow channel to [the] *a* free cross-sectional are of substantially each subsidiary flow channel being at least 2.5:1, the main strands being at least twice as tall as the subsidiary strands;
a pervious member against the first face of the mesh structure; and
a pervious or impervious member against the second face of the mesh structure.

10. An integrally-extruded plastics material mesh structure drainage core for forming a drainage system, the core having an overall, face-to-face thickness of at least 2.5 mm and being capable of resisting a pressure over its face of at least 100 kPa without catastrophic collapse, the core comprising two layers of mesh structure in the form of a single flattened tube, the mesh structure comprising generally parallel main strands extending generally longitudinally of the tube, interconnected by generally parallel subsidiary strands extending generally helically of the tube, the inner faces of the subsidiary strands being generally coplanar with the inner face of the mesh structure, and the subsidiary strands of one said layer thereby crossing the subsidiary strands of the other said layer to support one layer against the other, the mesh structure thereby defining main flow channels between and parallel to the main strands and [optionally] subsidiary flow channels between and parallel to the subsidiary strands, the ratio of the free cross-sectional area of substantially each main flow channel to the free cross-sectional area of substantially each subsidiary flow channel[, if any,] being at least 2.5:1, the main strands being at least twice as tall as the subsidiary strands.

11. An integrally-extruded, plastics material mesh structure drainage core for forming a drainage system, the core having an overall, face-to-face thickness of at least 4.5 mm, the mesh structure *defining a first face and a second face, and* comprising generally parallel main strands having a height of at least 4 mm and of truncated triangular cross-section, interconnected by generally parallel subsidiary strands whose width is greater than their height, the outer faces of the subsidiary strands being generally coplanar with [one] *said first* face of the mesh structure *and the main strands being spaced from said first face*, thereby defining main flow channels between and parallel to the main strands and [optionally] subsidiary flow channels between and parallel to the subsidiary strands, the ratio of [the] *a* free cross-sectional area of substantially each main flow channel to [the] *a* free cross-sectional area of substantially each subsidiary flow channel[, if any,] being at least 2.5:1, the main strands being at least 3.5 times as tall as the subsidiary strands, the pitch of the main strands being at least 1.5 times the pitch of the subsidiary strands, and the core exhibiting a flow fall-off of not more than about 20% under an external pressure normal to the face of 400 kPa.

*12. A drainage system comprising:*
*a integrally-extruded, plastics material mesh structure drainage core for forming a drainage system, the core having an overall, face-to-face thickness of at least 4.5 mm, the mesh structure defining a first face and a second face, and comprising generally parallel main strands having a height of at least 4 mm and of truncated triangular cross-section, interconnected by generally parallel subsidiary strands whose width is greater than their height, the outer faces of the subsidiary strands being generally coplanar with said first face of the mesh structure and the main strands being spaced from said first face, thereby defining main flow channels between and parallel to the main strands and subsidiary flow channels between and parallel to the subsidiary strands, the ratio of a free cross-sectional area of substantially each main flow channel to a free cross-sectional area of substantially each subsidiary flow channel being at least 2.5:1, the main strands being at least 3.5 times as tall as the subsidiary strands, the pitch of the main strands being at least 1.5 times the pitch of the subsidiary strands, and the core exhibiting a flow fall-off of not more than about 20% under an external pressure normal to the face of 400 kPa;*
*a pervious member against one of said first face and said second face of the mesh structure; and*
*a previous or impervious member against the other of said first face and said second face of the mesh structure.*

*13. An integrally-extruded, plastics material mesh structure drainage core for forming a drainage system, the core having an overall, face-to-face thickness of at least 2.5 mm and being capable of resisting a pressure over its face of at least 100 kPa without catastrophic collapse, the core comprising two layers of mesh structure in the form of a single flattened tube, the mesh structure comprising generally parallel main strands extending generally longitudinally of the tube, interconnected by generally parallel subsidiary strands extending generally helically of the tube, the inner faces of the subsidiary strands being generally coplanar with the inner face of the mesh structure, and the subsidiary strands of one said layer thereby crossing the subsidiary strands of the other said layer to support one layer against* the other, the mesh structure thereby defining flow channels between and parallel to the main strands and optionally subsidiary flow channels between and parallel to the subsidiary strands, the ratio of the free cross-sectional area of substantially each main flow channel to the free cross-sectional area of substantially each subsidiary flow channel being at least 2.5:1, the main strands being at least twice as tall as the subsidiary strands.

* * * * *